United States Patent [19]

Natterer

[11] Patent Number: 5,105,603
[45] Date of Patent: Apr. 21, 1992

[54] PACKAGING MACHINE FOR PRODUCING A RECLOSABLE PACKAGE FOR A PRODUCT

[75] Inventor: Johann Natterer, Legau, Fed. Rep. of Germany

[73] Assignee: Multivac Sepp Haggenmuller KG, Wolfertschwenden, Fed. Rep. of Germany

[21] Appl. No.: 621,588

[22] Filed: Dec. 3, 1990

[30] Foreign Application Priority Data

Dec. 13, 1989 [DE] Fed. Rep. of Germany ....... 3941183

[51] Int. Cl.⁵ .............................................. B65B 51/10
[52] U.S. Cl. ......................................... 53/412; 53/433;
53/478; 53/133.4; 53/511; 53/329.3
[58] Field of Search .................... 53/128, 133, 410, 412,
53/416, 433, 452, 453, 511, 559, 133.4, 139.2,
478, 329.3; 493/211, 213, 213

[56] References Cited

U.S. PATENT DOCUMENTS

| | | | |
|---|---|---|---|
| 3,303,628 | 2/1967 | Lovas et al. | 53/559 X |
| 3,524,298 | 8/1970 | Hamilton | 53/559 X |
| 3,805,486 | 4/1974 | Mahaffy et al. | 53/559 |
| 4,240,241 | 12/1980 | Sanborn, Jr. | 53/453 X |
| 4,349,999 | 9/1982 | Mahaffy et al. | |
| 4,437,293 | 3/1984 | Sanborn, Jr. | 53/453 X |
| 4,727,709 | 3/1988 | Zieke et al. | |
| 4,777,782 | 10/1988 | Nixon, Jr. et al. | 53/433 |
| 4,782,951 | 11/1988 | Griesbach et al. | |
| 4,969,309 | 11/1990 | Schwarz et al. | 53/412 |

FOREIGN PATENT DOCUMENTS 2161465 6/1973 Fed. Rep. of Germany .
3029603A1 3/1981 Fed. Rep. of Germany .
WO87/05583 9/1987 PCT Int'l Appl. .

Primary Examiner—John Sipos
Attorney, Agent, or Firm—Donald Brown

[57] ABSTRACT

A packaging machine for producing a reclosable package from a bottom film, a top film and a closure strip therebetween shall be designed to facilitate the generation of a hermetic seal in particular in the region of the closure strip with low film consumption. To this end a sealing station for sealing an edge portion between the product and the closure strip and an evacuation and sealing station having a chamber for sealing the package including the edge portion are provided.

2 Claims, 6 Drawing Sheets

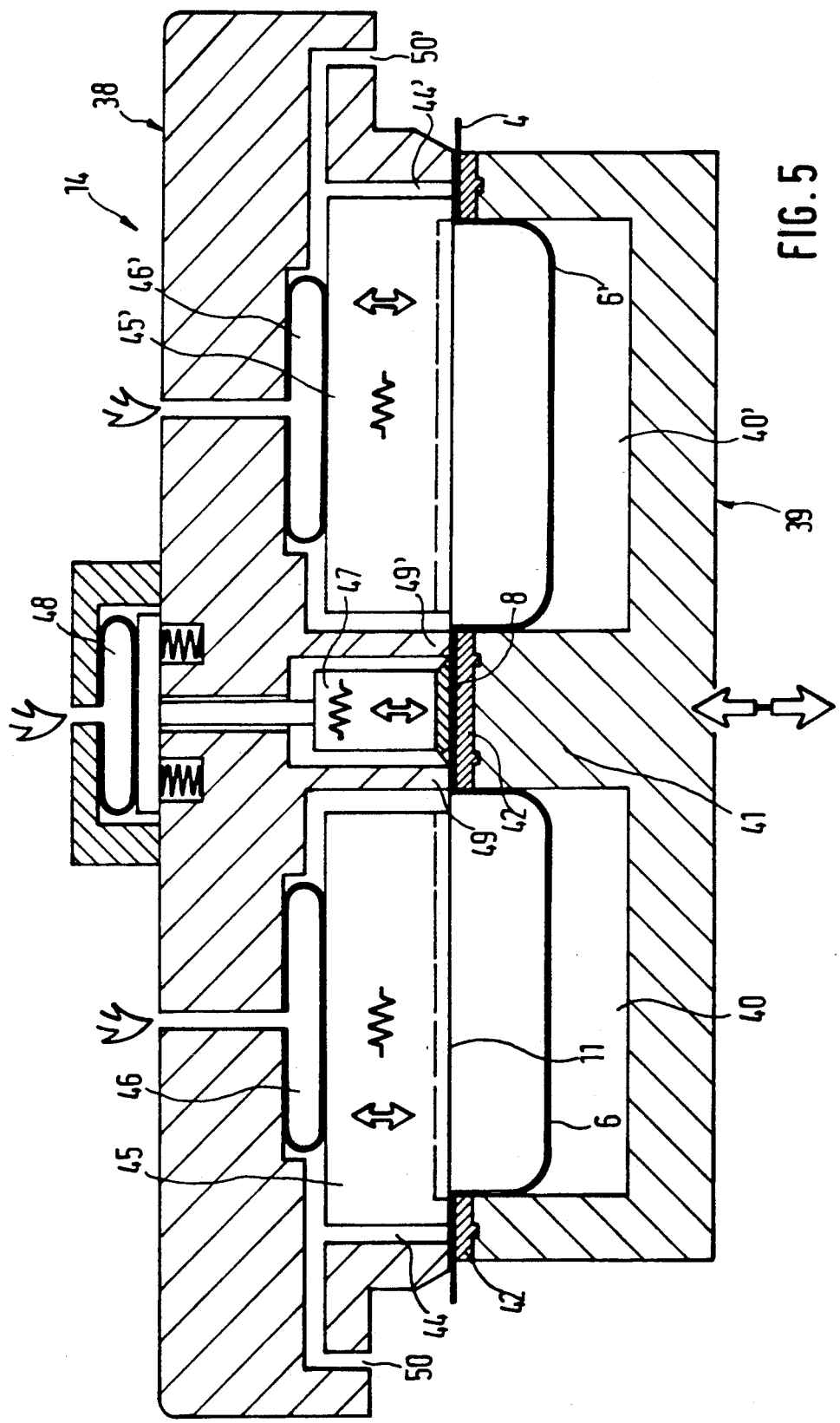

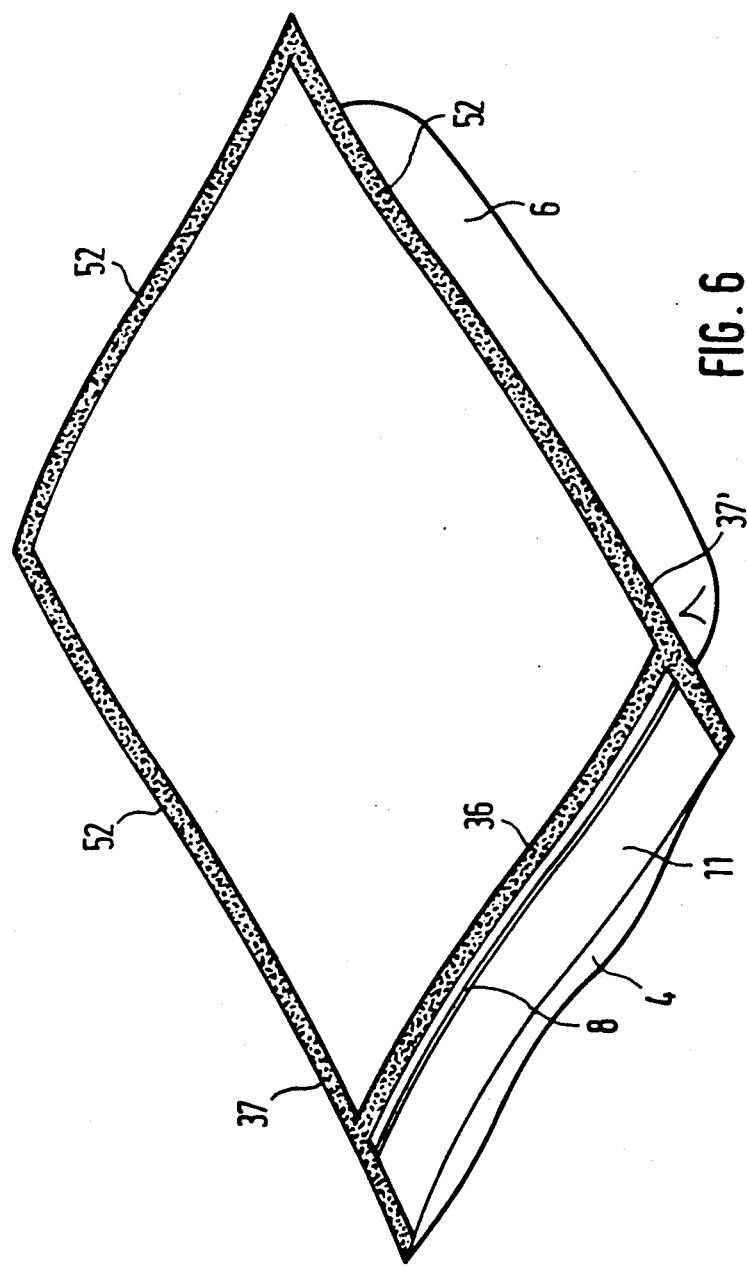

PACKAGING MACHINE FOR PRODUCING A RECLOSABLE PACKAGE FOR A PRODUCT

BACKGROUND OF THE INVENTION

The invention relates to a packaging machine for producing a reclosable package for a product. The package is produced from a bottom foil, a top foil and a closure strip therebetween.

A packaging machine of this kind is disclosed in U.S. Pat. No. 4,437,293. The package is evacuated and sealed in the chamber of an evacuation and sealing station. In such a chamber the edge of the package shall be clamped between the edges of the chambers formed in the housing of the evacuation and sealing station in a firm and hermetically sealed manner. A sealing bar for providing the seal after the evacuation is disposed within the chamber. For enabling a seal to be provided also in the regions where the closure strip crosses the seal portions of the closure strip were removed in a preceding step at the regions crossing the seal to be formed. In use the seal adjacent to the closure strip can be opened. Reclosure is possible by means of the closure strip. To this end the closure strip comprises a strip portion which is connected to the bottom film and a strip portion connected to the top film, wherein both portions are releasably interconnected by pressing both portions onto each other or in the manner of a zipper. The thickness of the closure strip is about 10 times to 20 times as high as that of the film.

The U.S. Pat. No. 4,782,951 discloses a package with a peelable closure means and a closure strip for reclosing.

OBJECTS OF THE INVENTION

It is an object of the invention to provide an improved packaging machine. It is a further object to design a packaging machine for producing perfectly sealed reclosable packages with low film consumption when using a continuous closure strip.

SUMMARY OF THE INVENTION

In order to achieve the above-mentioned objects the invention provides a packaging machine for producing a reclosable package for a product from a bottom film, a top film and a closure strip therebetween, the packaging machine comprising a sealing station for sealing an edge portion between the product and the closure strip and an evacuation and sealing station having a chamber for completely sealing the package.

BRIEF DESCRIPTION OF THE DRAWINGS

Further advantages, features and objects of the invention will stand out from the following description of an exemplary embodiment with reference to the drawings, wherein

FIG. 5 shows a section through the evacuation and sealing station; and

FIG. 6 is a perspective view of a formed package.

DESCRIPTION OF THE PREFERRED EMBODIMENT

Figure 1:
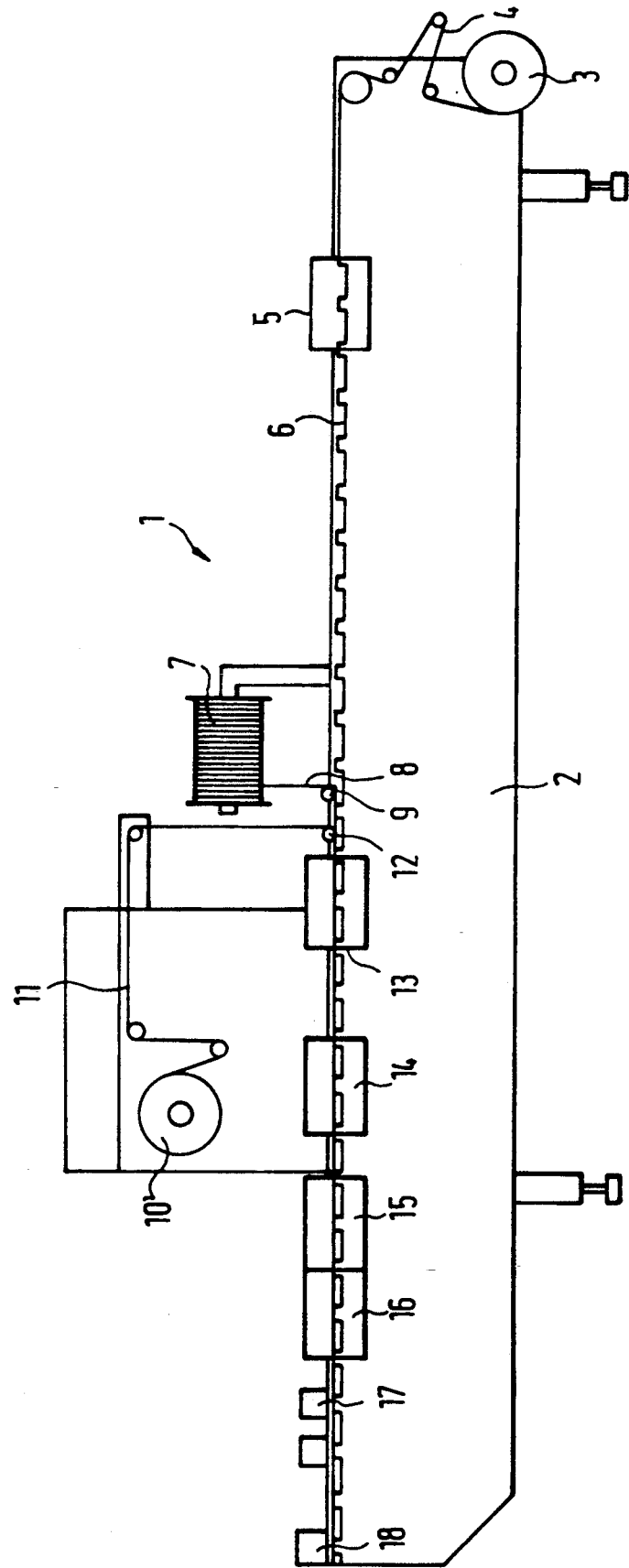
FIG. 1 is a schematic lateral view of the packaging machine with omitted front plate.

The packaging machine 1 comprises a machine frame 2 with an inlet side and an outlet side. A bottom film 4 is unrolled from a supply roll 3 located at the inlet side, grasped by clamper chains guided at both sides of the machine frame in known manner and passed to the outlet side through the various working stations The bottom film is first fed to a forming station 5 where trough-shaped containers 6 receiving the product to be packed are formed by deep-drawing. At a position following the filling operation a closure strip B is unrolled from a supply roll 7 and fed around a deflection roller 9 onto the bottom film 4 such that the closure strip is deposited on an edge 10 of the formed package 6. Thereafter a top or cover film 11 is guided from a supply roll 10' via a deflection roller 12 on top of the bottom film and of the closure strip. The sealing station 13 therebehind is followed by an evacuation and sealing station 14, a final or post-sealing station 15, a cooling station 16, a transverse cutting station 17 and a lengthwise cutting station 18.

The sealing station 13 comprises a fixed upper part 19 and a cooperating lower part 21 which is designed to be raised and lowered in direction of the arrow 20. In the embodiment shown in the Figures all working stations are designed such that two packages are formed simultaneously and side by side in feed direction. For receiving the two adjacent trough-shaped containers 6, 6' the lower part 21 has two adjacent chamber parts 22, 22' which are arranged side by side and separated by a land or gate 23 disposed between the two chamber parts. The gate includes two walls 24, 24' wherein each wall defines the associated chamber part and has an upper edge facing the upper part 19 provided with abutments 25, 25' for a sealing plate 26 disposed in the upper part. A heatable sealing bar 27 is arranged between the walls 24, 24'. The upper surface of the sealing bar facing the upper part lies in the same plane as the upper edge of the abutment-carrying upper edge of the chamber parts facing the upper part.

The upper part 10 has a continuous chamber-shaped recess 28 at the side thereof facing the lower part. A sealing means 29 is arranged within the recess 28 at a position above the gate 23. The sealing means 29 comprises a heatable sealing plate 26 which is adapted to be raised and lowered in direction of the arrow 30 within the recess and which is biased into the retracted position remote from the lower chamber by means of a schematically represented spring-operated readjusting means 31. The sealing plate is advanced towards the gate 23 by supplying pressurized fluid to a diaphragm 32 which is connected with a pressurized fluid source through a line 33. The edge of the bottom film lies on the edge of the lower part 21 and is firmly clamped by cooperation thereof with the edge of the upper part. The sealing plate has a recess at the side thereof opposite to the sealing bar 27 and a resilient abutment 34 is provided within the recess. The abutments 25, 25' and the sealing plate 26 cooperating therewith do not extend beyond the wall portion adjacent to the closure strip 8 and the immediately adjacent region of the transverse wall to be provided. This can be best seen from FIG. 2 which shows the edge portion formed by the sealing plate 26 in the region 35 corresponding to the sealing station, the edge portion comprising a portion 36 adjacent to the closure strip and edge projections 37, 37' adjacent thereto.

Figure 2:
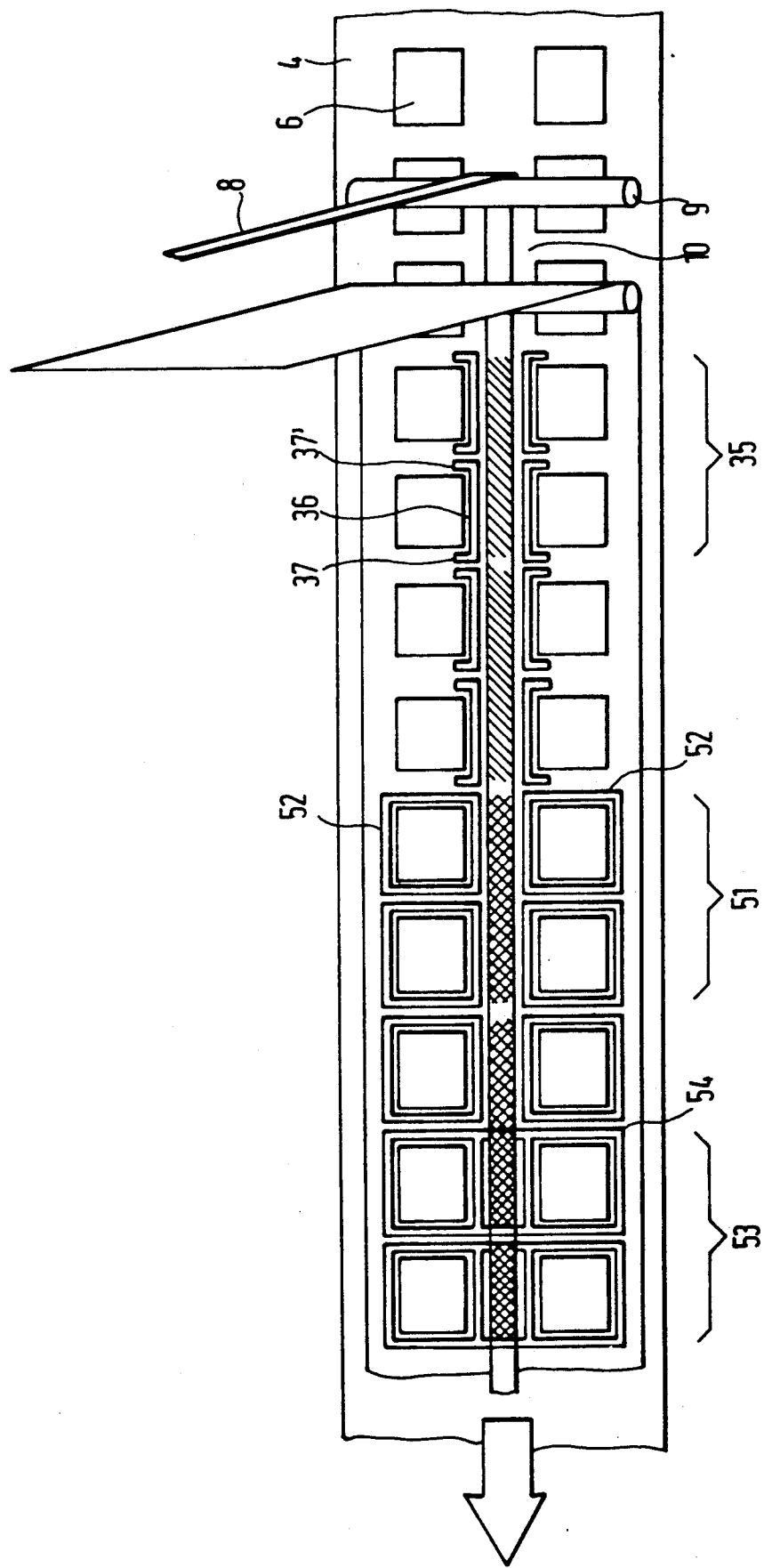
FIG. 2 is a top view of the film sheets or packages, resp., passing through the packaging machine.
Figure 3:
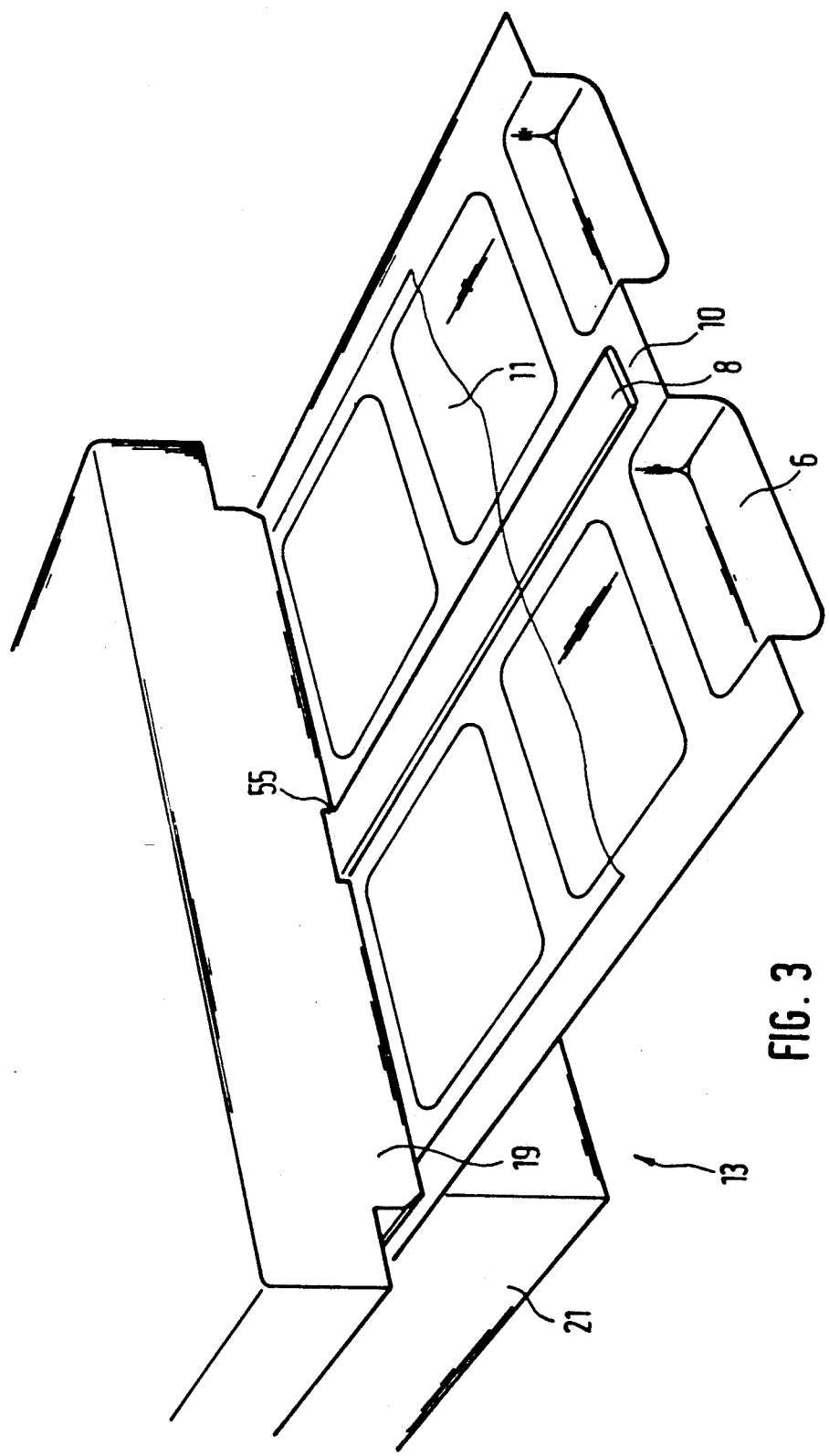
FIG. 3 is a perspective representation of part of the evacuation and sealing station of the packaging machine with the associated film portions.
Figure 4:
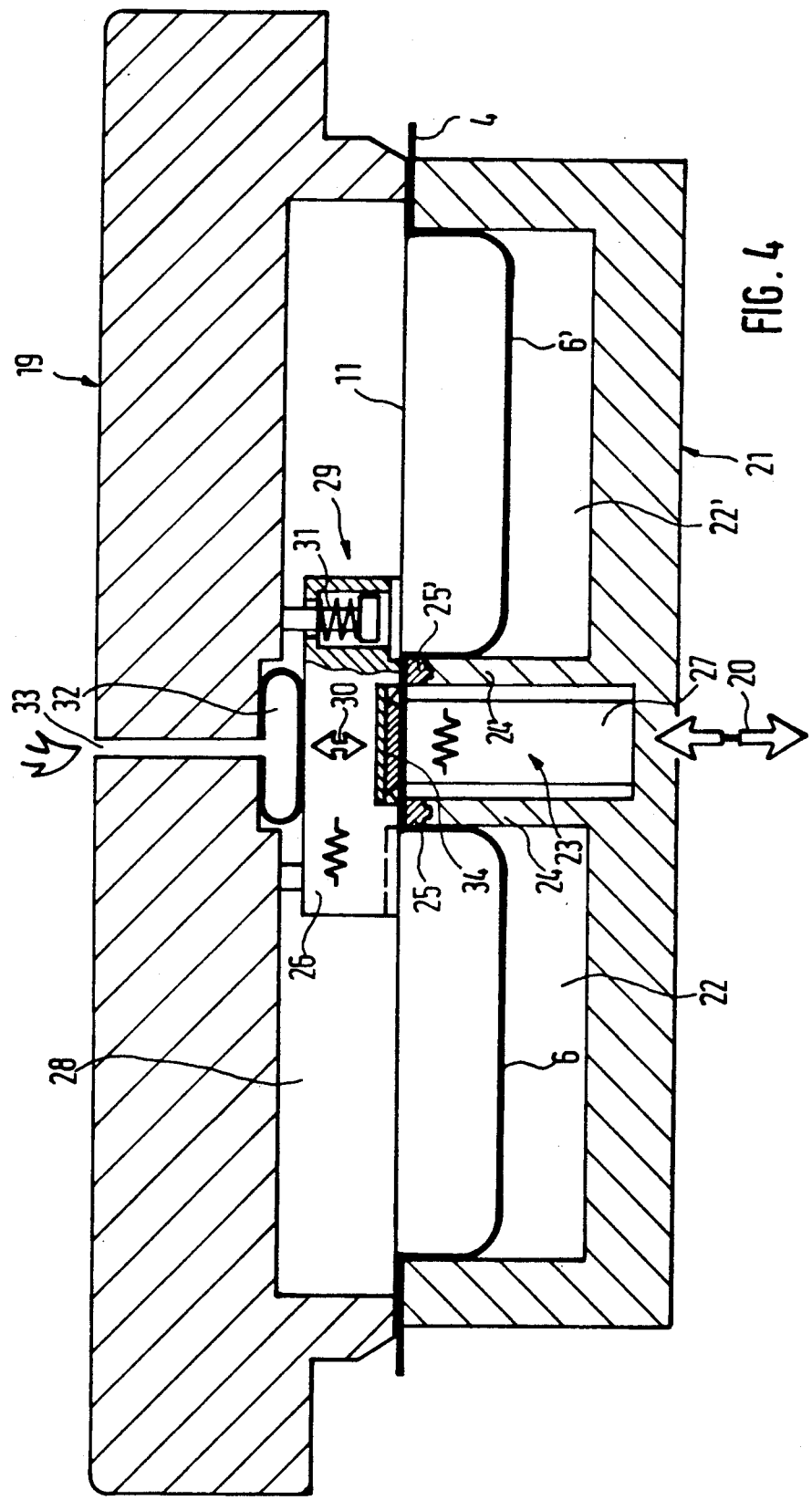
FIG. 4 shows a section through the sealing station.

In operation the sealing bar 27 and the sealing plate 26 are heated to the appropriate sealing temperature. The sealing plate 26 is pressed against the lower tool by supplying pressurized fluid to the diaphragm 32. The sealed edge portion between cover film and bottom film as shown in FIG. 2 is generated by cooperation of the sealing plate 26 and the abutment 25. The bottom film 4 and the facing side of the closure strip 8 are sealed together between the two edges shown in FIG. 2 by cooperation of the abutment 34 and the sealing bar 27.

At the end of the sealing operation the lower part is lowered and the sealed portion of the film webs is fed to the evacuation and sealing station.

The evacuation and sealing station 14 comprises a fixed upper part 38 and a movable lower part 39 which can be raised and lowered relative to the upper part 38. The lower part 39 has two chamber parts 40, 40' which are separated by a common land or gate 41 and serve for receiving the convex portions or depressions of the package. The gate and the whole edge surrounding the respective chamber parts comprise a resilient abutment 42 supporting the bottom film at the edge portions surrounding the depressions and in particular at the portion 36 which has been sealed in the sealing station 13.

The upper part 38 comprises two chamber parts 44, 44' which are separated by a land or gate 43 opposite to the gate 41. Sealing plates 45, 45' are disposed in the chamber parts 44, 44'. The sealing plates are biased into a retracted position remote from the lower part by spring-biased readjusting means in the same manner as the sealing plate 26. The gate 43 has a sealing bar 47 disposed therein in the region above the closure strip 8. The sealing bar 47 is adapted to be moved into a retracted position remote from the lower chamber by means of a corresponding spring-operated readjusting means and advanced towards the lower chamber by means of a diaphragm means 48 supplied with pressurized fluid. The two sealing plates 45, 45' are each formed to cooperate with that portion of the edge of the lower chamber which follows the edge portions 36, 37, 37' sealed in the sealing means 13 in such a manner that a part of the edge projections 37, 37' is overlapped. Hence, the sealing plates do not extend over the edge portion 36 above the gate 41 which had already been sealed in the sealing means 13. By operating the diaphragms 46, 46' the sealing plates 45, 45' heated up to the respective sealing temperature are pressed onto the film edges resting on the abutment 42, whereby the cover film and the bottom film are sealed together in the not yet sealed region and in a region partly overlapping the edge projections 37, 37'. The portion 36 which had been sealed in the sealing station is tightly closed by the wall portions 49, 49' defining the chambers 44, 44' and clamping the film edges by cooperation with the abutment 42. Each chamber 40, 40' is hermetically closed or sealed by cooperation of the surrounding edge of the respective chambers 44, 44' and the surrounding abutment 42 such that the interior of the package can be evacuated by schematically indicated evacuation connections 50, 50' or supplied with gas before sealing the same.

The sealing bar 47 is advanced towards the lower chamber from the retracted position into the sealing position shown in FIG. 5 by actuating the sealing bar 47 heated in operation to a respective sealing temperature through the diaphragm means 48. The cover film 11 is sealed with the facing part of the closure strip 8 by action of the sealing bar onto the portion of the cover film between the abutment 42 and the sealing bar.

In this manner the completely sealed edges 52 are generated which are shown in the portion 51 corresponding to the station 14. While the seal in portion 35 between the closure strip and the bottom film is shown in dotted lines in FIG. 2, the additional seal between the closure strip and the cover film is indicated by cross-hatching.

After finishing the operation the lower part 39 is lowered and the sealed packages are moved on.

The final sealing station 15 following in advance direction comprises highly preheated cross-sealing bars which are moved to the position of the already generated cross-seals with a respective high pressure such that a firm final sealing in transverse direction across the total side of the packages and across the closure strip is obtained. The portion corresponding to the final sealing station 15 is indicated with reference sign 53 in FIG. 2. The continuous transverse seals or seams 54 indicated in this portion are produced. Since the packages have already been hermetically sealed in the preceding evacuation and sealing station, a tight closure or seal between the upper and lower part of the respective sealing tool is not required in this case.

In the following stations the packages are further processed and in particular severed or separated in conventional manner. In the described embodiment having two adjacent containers 6, 6' and packages formed therefrom, resp., the closure strip 8 comprises two reclosure means which are provided at the outer edges of the closure strip and which can be separated from each other by a center cut. By sealing in the above described manner and subsequently cutting lengthwise between both reclosure means two independent packages are produced which each have a reclosure means. Such a package is shown in FIG. 6 wherein only the sealing portion of the closure strip which faces the severed package is shown.

In the above described embodiment two adjacent packages are provided. However, it is also possible to produce a single package only whereby the second chamber is simply omitted.

To allow the portion 36 adjacing the reclosure member of the closure strip 8 to be more easily opened than the remaining edges 52 the temperature of the sealing plate 26 in the sealing station is adjusted to a lower value than the temperature of the sealing plates 44 or of the cross-sealing bar in station 15, resp. The adjustment is carried out in conventional manner such that a peelable seal or seam 36 is obtained.

While the invention has been described in prefered form it is not limited to the precise nature shown as various modifications may be made without departing from the scope of the appended claims.

What is claimed is:

1. A packaging machine for producing a reclosable package for a product from a bottom film (4), a cover film (11), and a closure strip (8) therebetween, comprising in the transport direction a forming station (5) for forming cavities (6) into said bottom film (4), a filling station, a station (9) for applying said closure strip (8) onto said bottom film (4), a first sealing station (13) for sealing said closure strip (8) onto said bottom film (4) and simultaneously sealing said cover film (11) along some of the sides and adjacent to said cavities (6) onto said bottom film (4), a second sealing station (14) for evacuating said cavities (6) and for sealing the cover film to said bottom film to seal those sides of said cavities which have not been sealed in the first sealing station (13), and in which said second sealing station also seals said cover film to said closure strip.

2. A method for producing a reclosable package comprising the steps of (1) sealing a bottom film having a cavity to a closure strip at a position adjacent to an edge of said cavity, (2) sealing a cover film and to said bottom strip to seal off a portion of an edge of said cavity adjacent to said closure strip and evacuating said cavity, and (3) sealing the unsealed edge portion of said cavity with said cover film and sealing said cover sheet to said closure strip.

* * * * *